US009592999B2

(12) United States Patent
Ditzler et al.

(10) Patent No.: US 9,592,999 B2
(45) Date of Patent: *Mar. 14, 2017

(54) BOOM APPARATUS WITH NOSE BODY

(71) Applicant: Deere & Company, Moline, IL (US)

(72) Inventors: Steven J. Ditzler, Bellevue, IA (US); Peter D. Zach, Ithica, NY (US); James F. O'Halloran, Hamilton (CA); Jonathan R. Hunt, Garnavillo, IA (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/646,279

(22) PCT Filed: Feb. 1, 2013

(86) PCT No.: PCT/US2013/024413
§ 371 (c)(1),
(2) Date: May 20, 2015

(87) PCT Pub. No.: WO2014/120243
PCT Pub. Date: Aug. 7, 2014

(65) Prior Publication Data
US 2015/0336778 A1    Nov. 26, 2015

Related U.S. Application Data

(63) Continuation of application No. PCT/US2013/024155, filed on Jan. 31, 2013, and a
(Continued)

(51) Int. Cl.
*B66C 23/06*    (2006.01)
*B66C 23/64*    (2006.01)
(Continued)

(52) U.S. Cl.
CPC ............ *B66C 23/64* (2013.01); *A01D 34/866* (2013.01); *B66C 13/14* (2013.01); *E02F 3/38* (2013.01);
(Continued)

(58) Field of Classification Search
CPC ...... A01D 34/866; B66C 13/14; B66C 23/64; E02F 3/38; E02F 3/425; E02F 9/006; E02F 9/2275; A01G 23/08
(Continued)

(56) References Cited

U.S. PATENT DOCUMENTS

| 5,806,313 A | 9/1998 | Koshi et al. |
| 6,612,051 B2 | 9/2003 | Weyer et al. |

(Continued)

FOREIGN PATENT DOCUMENTS

| CA | 2346323 A1 * | 11/2001 | ............... E02F 3/34 |
| IN | 239227 | 9/2011 | |

OTHER PUBLICATIONS

International Search Report and the Written Opinion of the International Searching Authority, or the Declaration, PCT/US13/24413, dated Apr. 29, 2013 (11 pages).
(Continued)

*Primary Examiner* — Gwendolyn Baxter
(74) *Attorney, Agent, or Firm* — Michael Best & Friedrich LLP (57) ABSTRACT

A boom apparatus comprises at least one flexible line and a boom. The boom comprises a nose body. The nose body comprises a passageway through which the at least one flexible line is routed.

16 Claims, 10 Drawing Sheets

Related U.S. Application Data continuation of application No. PCT/US2013/024146, filed on Jan. 31, 2013, and a continuation of application No. 13/755,845, filed on Jan. 31, 2013, now Pat. No. 9,200,424, which is a continuation-in-part of application No. 13/236,935, filed on Sep. 20, 2011, now Pat. No. 9,121,163.

(51) Int. Cl.

| | | |
|---|---|---|
| *B66C 13/14* | (2006.01) | |
| *A01D 34/86* | (2006.01) | |
| *E02F 3/38* | (2006.01) | |
| *E02F 9/00* | (2006.01) | |
| *E02F 9/22* | (2006.01) | |
| *E02F 3/42* | (2006.01) | |
| *A01G 23/08* | (2006.01) | |

(52) U.S. Cl.
CPC .............. *E02F 3/425* (2013.01); *E02F 9/006* (2013.01); *E02F 9/2275* (2013.01); *A01G 23/08* (2013.01)

(58) Field of Classification Search
USPC .......... 37/406, 408, 409; 414/723, 724, 732, 414/543, 680, 685, 694; 52/111, 166
See application file for complete search history.

(56) References Cited

U.S. PATENT DOCUMENTS

| | | | |
|---|---|---|---|
| 6,758,024 B1 * | 7/2004 | Mieger | E02F 3/38 |
| | | | 52/839 |
| 6,786,233 B1 * | 9/2004 | Anderson | B66C 23/64 |
| | | | 137/615 |
| 6,872,043 B2 | 3/2005 | Yukawa et al. | |
| 7,008,169 B1 | 3/2006 | Miyanishi | |
| 9,200,424 B2 * | 12/2015 | Ditzler | E02F 3/38 |
| 2002/0170212 A1 | 11/2002 | Sasaki et al. | |
| 2003/0118432 A1 * | 6/2003 | Lee | B66C 23/64 |
| | | | 414/722 |
| 2012/0241404 A1 | 9/2012 | Bobeck | |
| 2016/0024743 A1 * | 1/2016 | Ulrich | E02F 3/38 |
| | | | 414/727 |

OTHER PUBLICATIONS

Images of Deere Boom (2 pages) (admitted as prior art before Sep. 20, 2011).
Background Information (1 page) (admitted as prior art before Sep. 20, 2011).
Report of Indian Design Patent No. 239227 (1 page)(Sep. 5, 2011).

* cited by examiner

BOOM APPARATUS WITH NOSE BODY

FIELD OF THE DISCLOSURE

The present disclosure relates to a boom apparatus. In particular, it relates to a nose of the boom apparatus.

BACKGROUND OF THE DISCLOSURE

There are forestry machines that have a boom apparatus and a work tool attached to the nose of the boom apparatus. A number of flexible lines (e.g., hydraulic and electrical) are routed along the boom apparatus past the nose to the work tool.

SUMMARY OF THE DISCLOSURE

According to an aspect of the present disclosure, a boom apparatus comprises a clevis pin unit, at least one flexible line, and a boom. The at least one flexible line extends longitudinally of the boom. The boom comprises a first boom side wall, a second boom side wall spaced apart from the first boom side wall laterally of the boom, a top wall, a bottom wall spaced apart from the top wall, and a monolithic nose body. The top wall and the bottom wall interconnect the first boom side wall and the second boom side wall. The first boom side wall, the second boom side wall, the top wall, and the bottom wall cooperate to define a periphery of a box structure of the boom. The first boom side wall and the second boom side wall extend longitudinally of the boom beyond the box structure to provide respectively a first wall extension and a second wall extension.

The nose body is positioned at a nose of the boom and the boom apparatus. The nose body is attached to and sandwiched between the first and second wall extensions and attached to the top and bottom walls so as to close an end portion of the box structure. The nose body and the first and second wall extensions receive therein the clevis pin unit such that the nose body, the first and second wall extensions, and the clevis pin unit are included in a clevis of the boom apparatus for suspension of a work tool therefrom. The nose body comprises a passageway through which the at least one flexible line is routed.

The above and other features will become apparent from the following description and the coupled drawings.

BRIEF DESCRIPTION OF THE DRAWINGS

The detailed description of the drawings refers to the accompanying figures in which.

DETAILED DESCRIPTION OF THE DRAWINGS

Figure 1:
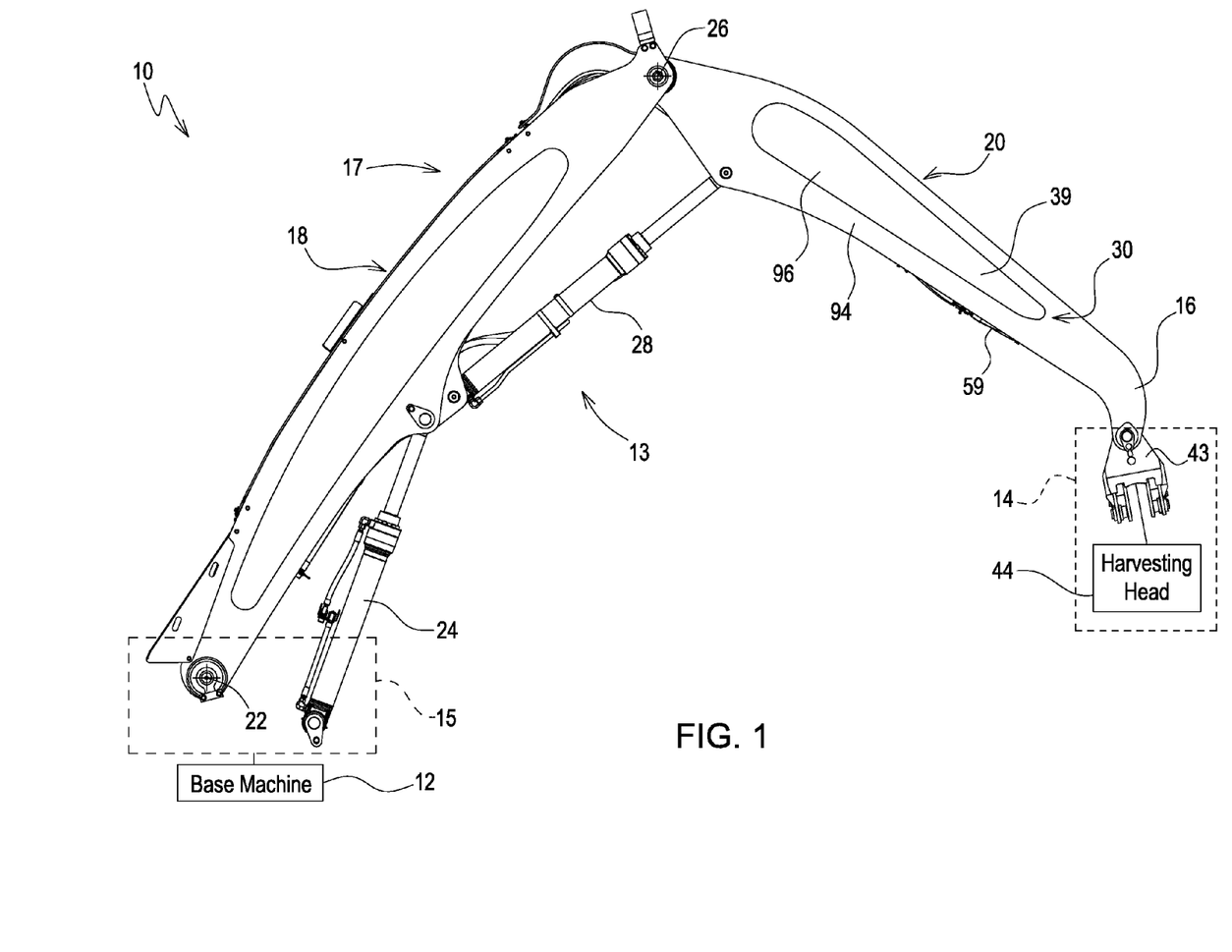
FIG. 1 is a right-hand side elevation view showing a boom apparatus attached to a diagrammatic base machine and a diagrammatic work tool.
Figure 2:
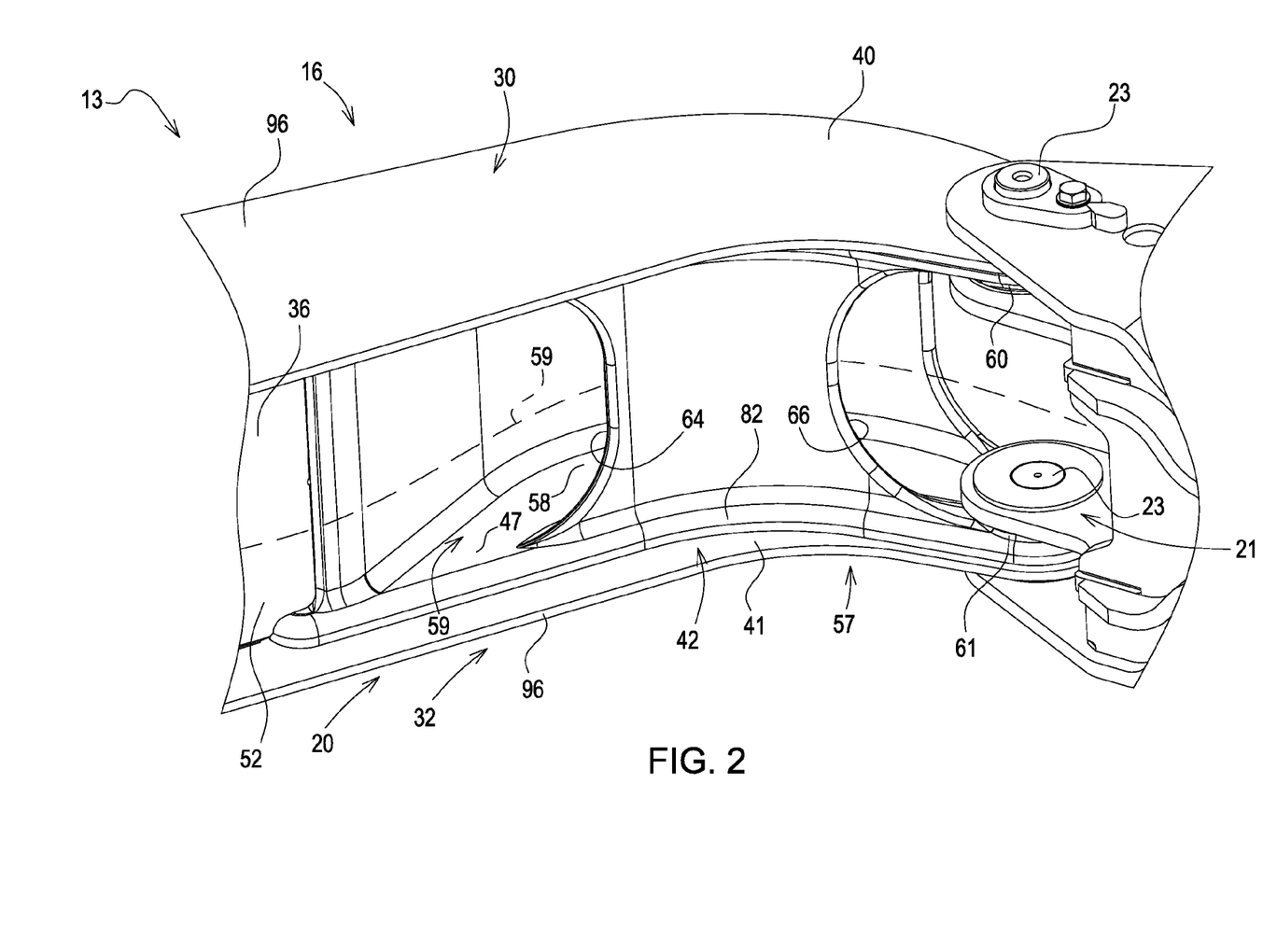
FIG. 2 is a perspective view, with portions broken away, showing routing of at least one flexible line (shown diagrammatically as a dashed line) through a passageway of a nose body of the nose of the boom apparatus.

Referring to FIG. 1, an exemplary work machine 10 comprises a base machine 12, a boom apparatus 13, and a work tool 14. The work machine 10 may be any of a variety of work machines.

For example, the work machine 10 may be a forestry machine. In such a case, the base machine 12 may be, for example, a tracked feller buncher or a wheeled or tracked harvester. The work tool 14 may be a hydraulically-actuated forestry attachment, such as, for example, a disk saw felling head, a harvesting head, a debarking head, a cutting head, a delimber, a tree handling device, or a combination thereof, to name but a few forestry attachments. The boom apparatus 13 is illustrated, for example, as a boom apparatus for a forestry harvester, it being understood that the boom apparatus 13 may be configured for a wide variety of work machines.

The boom apparatus 13 comprises a first end portion 15 and a second end portion 16. The first end portion 15 is attached to the base machine 12, and the work tool 14 is attached to the second end portion 16. As such, the second end portion 16 is the working end portion, or nose, of the boom apparatus 13. Illustratively, the work tool 14 may comprise, for example, a connector 43 attached pivotally to the nose 16 and a harvesting head 44 suspended from the connector 43 as indicated diagrammatically. The connector 43 is useful with a rotator (not shown) of the harvesting head 44 that can rotate the harvesting head 44 more than 360 degrees, although the connector 43 may be configured in other ways (e.g., a dog-bone connector) with less rotatability of the harvesting head 44.

The boom apparatus 13 comprises a heavy duty boom structure 17. Exemplarily, the boom structure 17 comprises a first or hoist boom 18 and a second or stick boom 20. The first boom 18 is attached pivotally to the base machine 12 for pivotal movement of the first boom 18, and thus the boom structure 17, relative to the base machine 12 about a first boom pivot axis 22. The second boom 20 is attached pivotally to the first boom 18 for pivotal movement of the second boom 20 relative to the first boom 18 about a second boom pivot axis 26. Each of the booms 18, 20 is configured, for example, as a weldment.

The boom apparatus 13 comprises two hoist cylinders 24 configured as two fluid cylinders (e.g., hydraulic cylinders). The hoist cylinders 24 are attached pivotally to the base machine 12 and the first boom 18 to raise and lower the first boom 18, and thus the boom structure 17, relative to the base machine 12 about the first boom pivot axis 22.

The boom apparatus 13 comprises a stick cylinder 28 configured as a fluid cylinder (e.g., hydraulic cylinder). The stick cylinder 28 is attached pivotally to the first boom 18 and the second boom 20 to pivot the second boom 20 relative to the first boom 18. The cylinder 28 is so attached to pivot the second boom 20 relative to the first boom 18 about the second boom pivot axis 26.

Referring to FIGS. 2-5, the second boom 20 comprises a first boom side wall 30, a second boom side wall 32 spaced apart from the first boom side wall 30 laterally of the second boom 20, a top wall 34, and a bottom wall 36 spaced apart from the top wall 34 depth-wise of the second boom 20. The top wall 34 and the bottom wall 36 interconnect and are welded to the first boom side wall 30 and the second boom side wall 32. The first boom side wall 30, the second boom side wall 32, the top wall 34, and the bottom wall 36 cooperate to define a periphery 38 of a box structure 39 of the second boom 20. The structure 39 is hollow given that it has a box shape. The first boom side wall 30 and the second boom side wall 32 extend longitudinally of the second boom 20 beyond the box structure 39 to provide respectively a first wall extension 40 and a second wall extension 41.

The second boom 20 comprises a monolithic (one-piece) nose body 42. The nose body 42 is positioned at the nose 16 of the second boom 20 and the boom apparatus 13. The nose body 42 bridges a width 51 between (inclusively) the first and second wall extensions 40, 41 laterally of the second boom 20.

The nose body 42 is attached to and sandwiched between the first and second wall extensions 40, 41 and attached to the top and bottom walls 34, 36 so as to close an end portion 52 of the box structure 39. Such a configuration may promote stress minimization and part count economy in a clevis 57 of the boom apparatus 13.

The nose body 42 and the first and second wall extensions 40, 41 receive therein a clevis pin unit 21 such that the nose body 42, the first and second wall extensions 40, 41, and the clevis pin unit 21 are included in the clevis 57 of the boom apparatus 13 for suspension of the work tool 14 therefrom. The nose body 42 comprises a passageway 58 through which at least one flexible line 59 of the boom apparatus 13 is routed.

The at least one flexible line 59 extends longitudinally of the second boom 20 along an underside thereof. In an example, there are several such flexible lines 59 (e.g., hydraulic and electrical lines), represented diagrammatically as a dashed line. Since the lines 59 are routed through the passageway 58, they do not hang down as they pass through the nose 16 to the work tool 14. The passageway 58 thus promotes protection of the lines 59 against vulnerability to damage and an aesthetically pleasing, clean appearance in the nose area of the second boom 20. Routing of the lines 59 through the passageway 58 further promotes simplification of the routing of the lines 59 through the nose 16.

Referring to FIGS. 6-10, the nose body 42 comprises a first body side wall 46, a second body side wall 47 spaced apart from the first body side wall 46 laterally of the second boom 18, an upper, spinal wall 48, and a lower, barrier wall 49 spaced apart from the spinal wall 48. The spinal and barrier walls 48, 49 interconnect the first and second body side walls 46, 47. The first and second body side walls 46, 47 are attached (e.g., welded) respectively to the first and second wall extensions 40, 41. The spinal wall 48 is attached to the top wall 34 and the bottom wall 36 as part of closing the end portion 52 of the box structure 39 by the nose body 42. The passageway 58 is defined between the spinal and barrier walls 48, 49 and between the first and second body side walls 46, 47.

Referring to FIGS. 2-5, the clevis pin unit 21 is received in a first collar 60 of the first body side wall 46 and a second collar 61 of the second body side wall 47. The clevis pin unit 21 comprises a first clevis pin 23 received in the first collar 60 and a second clevis pin 23 received in the second collar 61.

Figure 5:
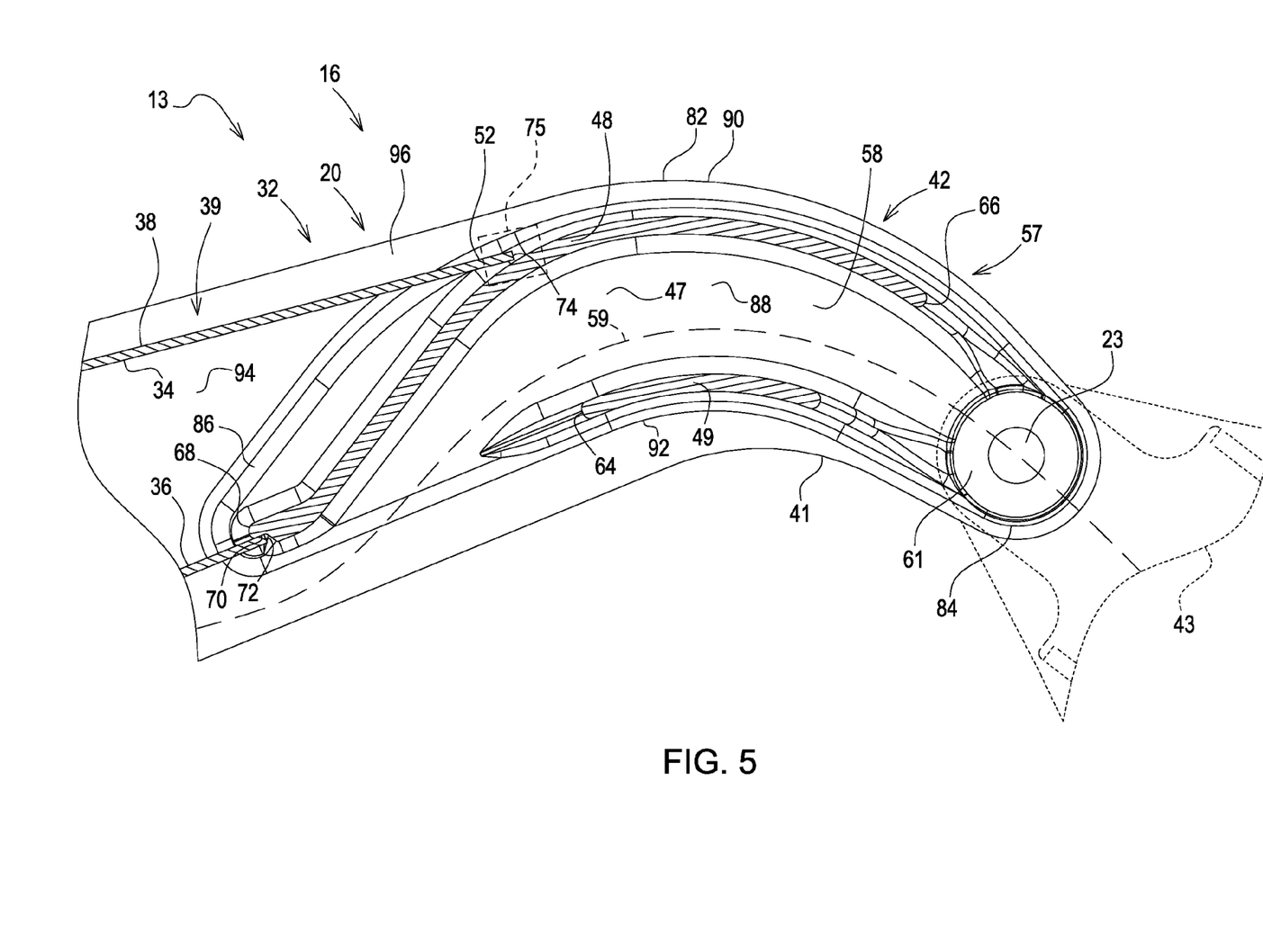
FIG. 5 is a sectional view, taken along lines 5-5 of FIG. 3.
Figure 6:
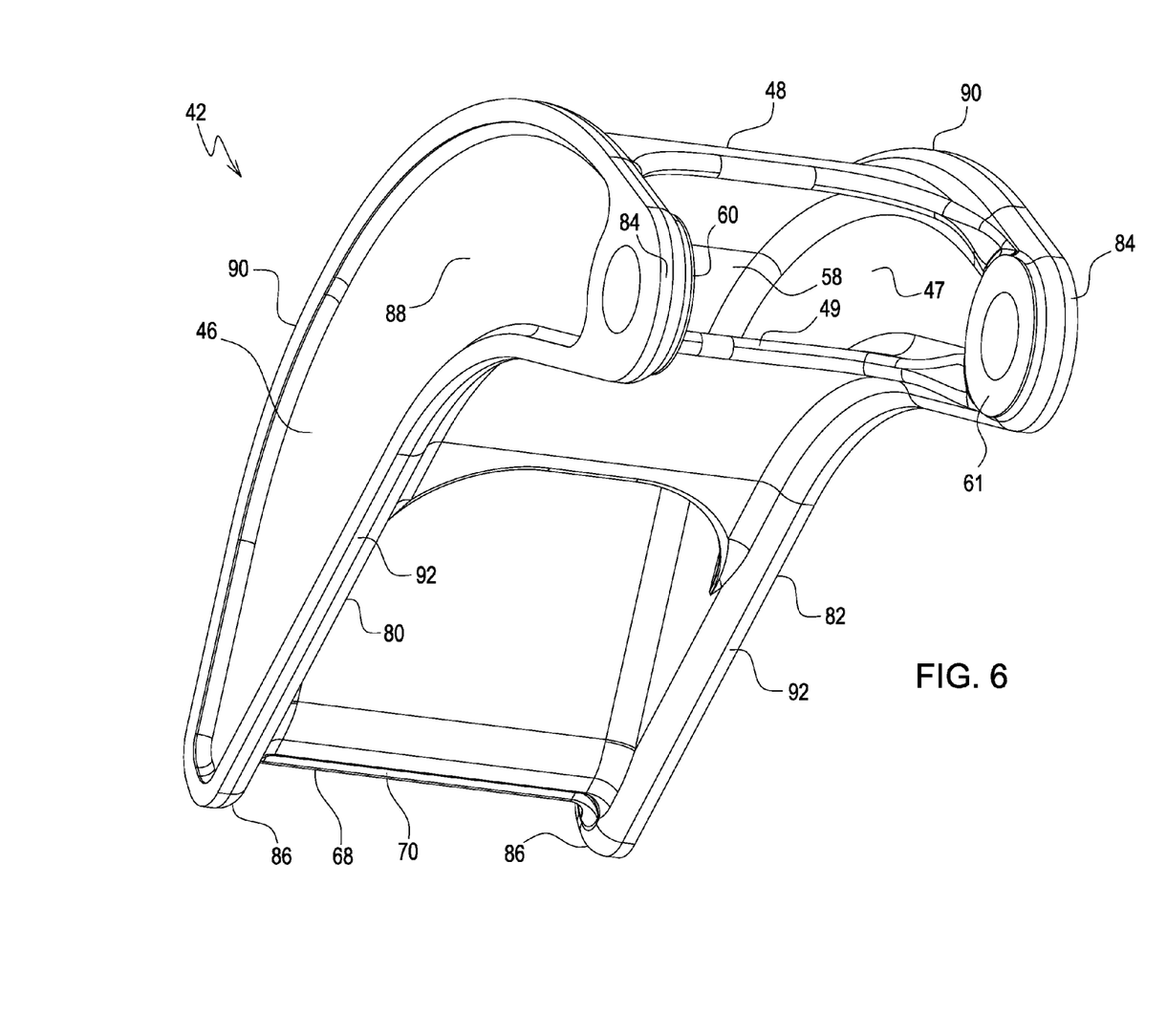
FIG. 6 is a perspective view of the nose body.
Figure 7:
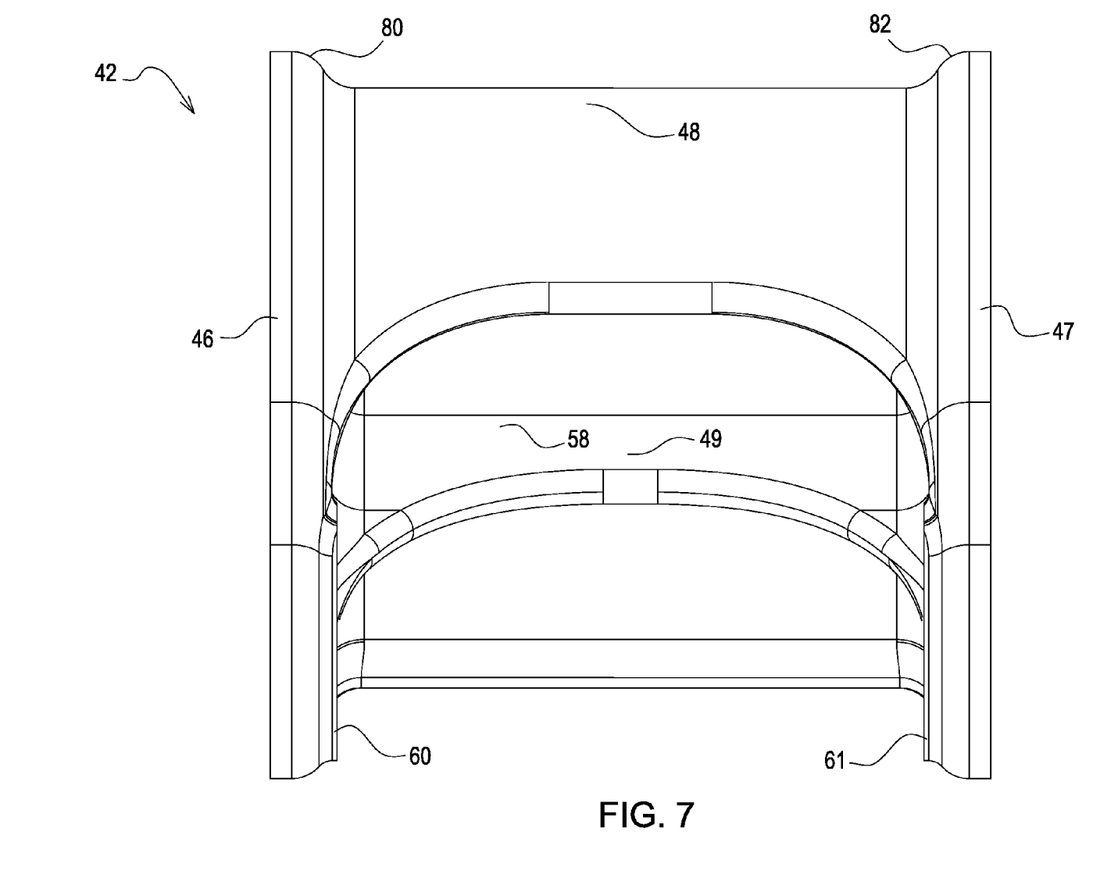
FIG. 7 is a front elevation view of the nose body.
Figure 8:
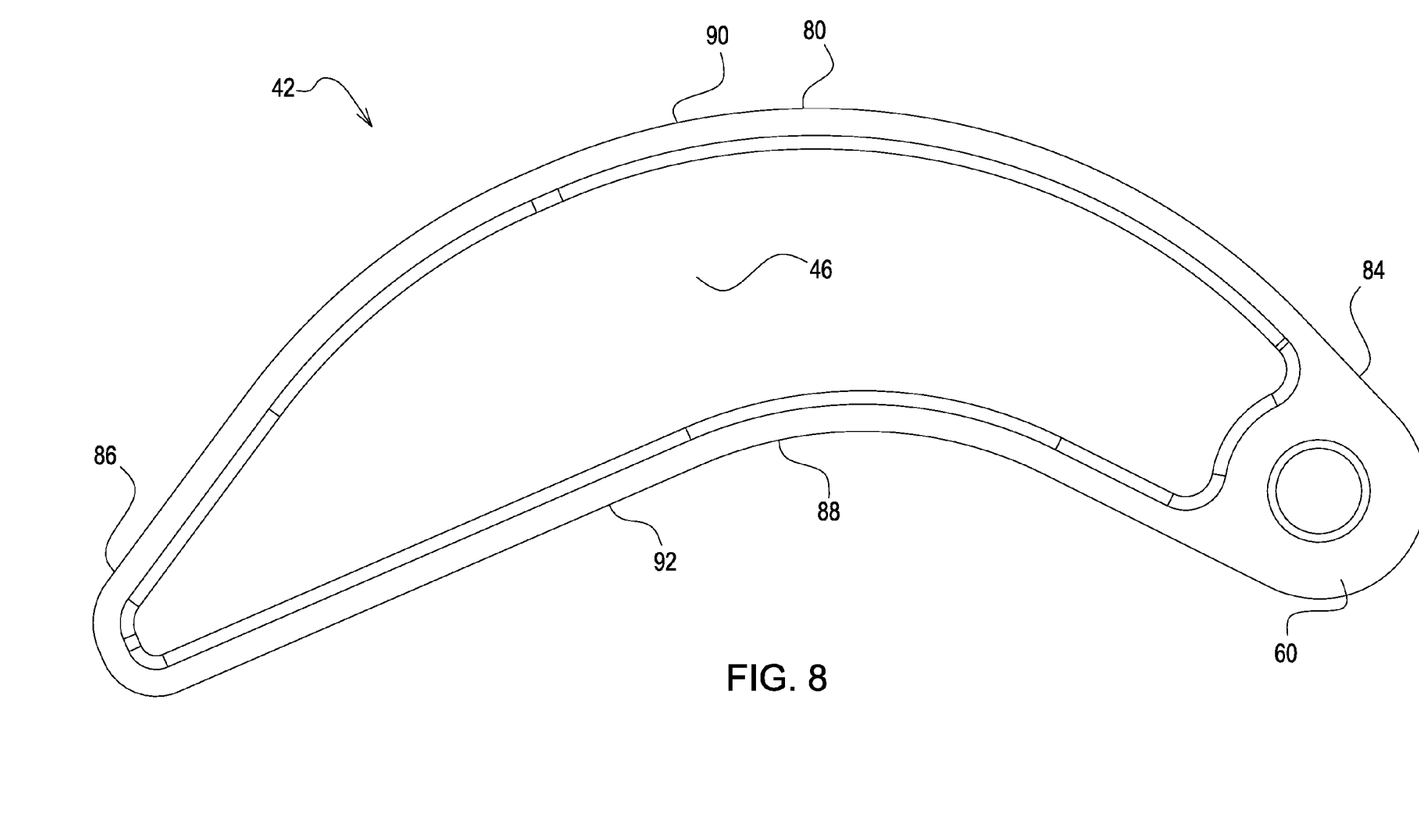
FIG. 8 is a right-hand side elevation view of the nose body.
Figure 9:
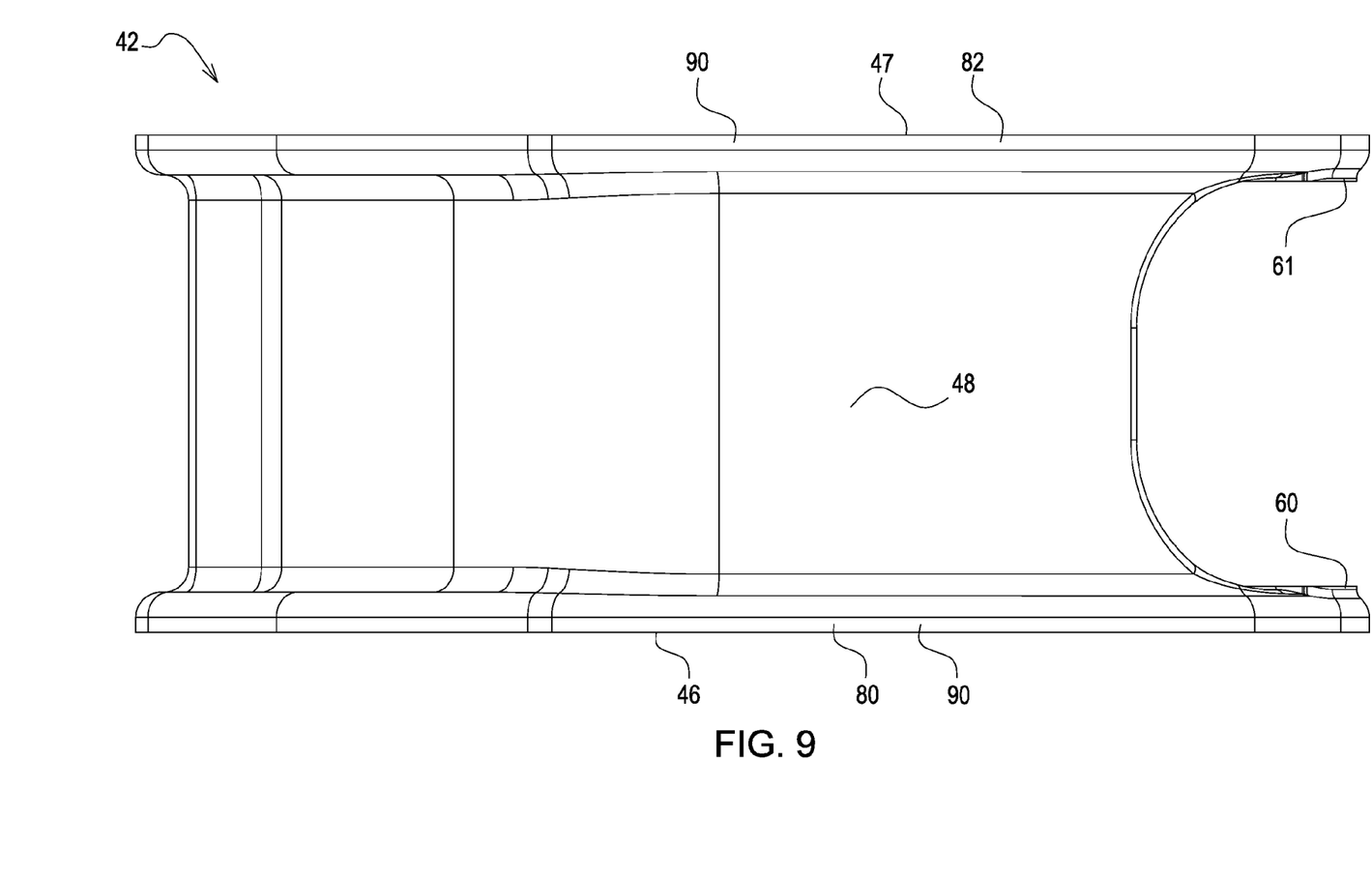
FIG. 9 is a top view of the nose body.
Figure 10:
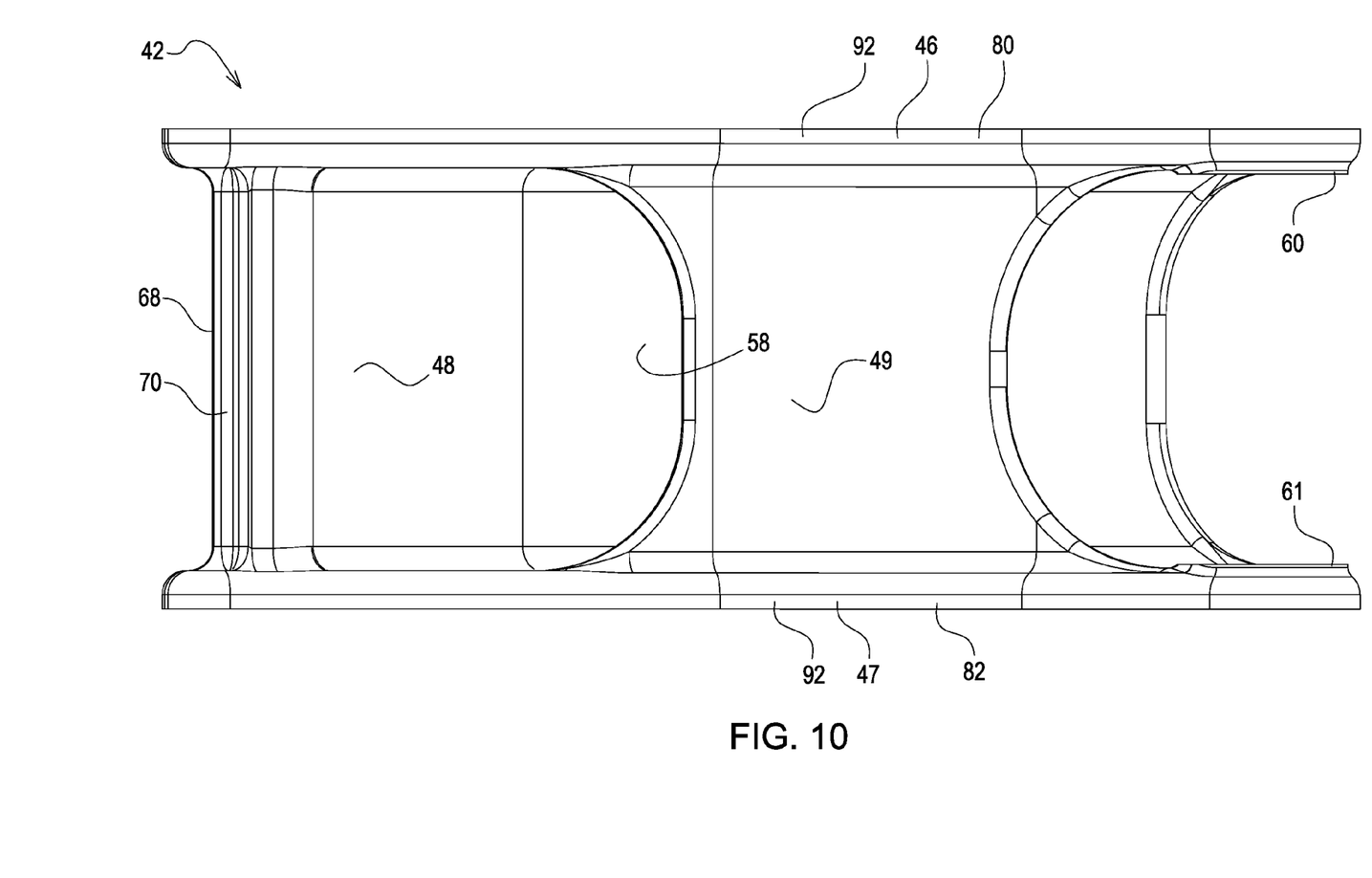
FIG. 10 is a bottom view of the nose body.

Referring to FIG. 5, the nose body 42 is arched in its lateral profile (see also FIG. 6). The spinal wall 48 is longer than and arches about the barrier wall 49 such that the passageway 58 is arched so as to direct smoothly the routing of the at least one flexible line 59 through the nose 16. In so doing, the at least one flexible line 59 enters the passageway 58 via a rearward opening 64 defined between the spinal and barrier walls 48, 49 and exits the passageway 58 via a forward opening 66 defined between the spinal and barrier walls 48, 49. The at least one flexible line 59 is routed sequentially through the rearward opening 64, the passageway 58, and the forward opening 66, avoiding sharp edges on passage through the nose 16. In the case of the illustrated connector 43, the at least one flexible line 59 is then routed through a central passageway of the connector 43 to the harvesting head 44.

The nose body 42 is attached to the box structure 39 as part of closing the end portion 52 of the box structure 39 by the nose body 42. Each of the spinal wall 48, the first body side wall 46, and the second body side wall 47 is attached (e.g., welded) to the top wall 34 and the bottom wall 36.

The spinal wall 48 is attached to the bottom wall 36. The spinal wall 48 comprises a rearward end edge 68. The end edge 68 comprises a groove 70. The groove 70 receives a forward end edge 72 of the bottom wall 36 such that the forward end edge 72 is attached (e.g., welded) to the groove 70.

The spinal wall 48 is attached to the top wall 34. The spinal wall 48 is attached to a forward end edge 74 of the top wall 34. For example, the spinal wall 48 is welded to the forward end edge 74 of the top wall 34, as indicated by a diagrammatic box 75.

Figure 3:
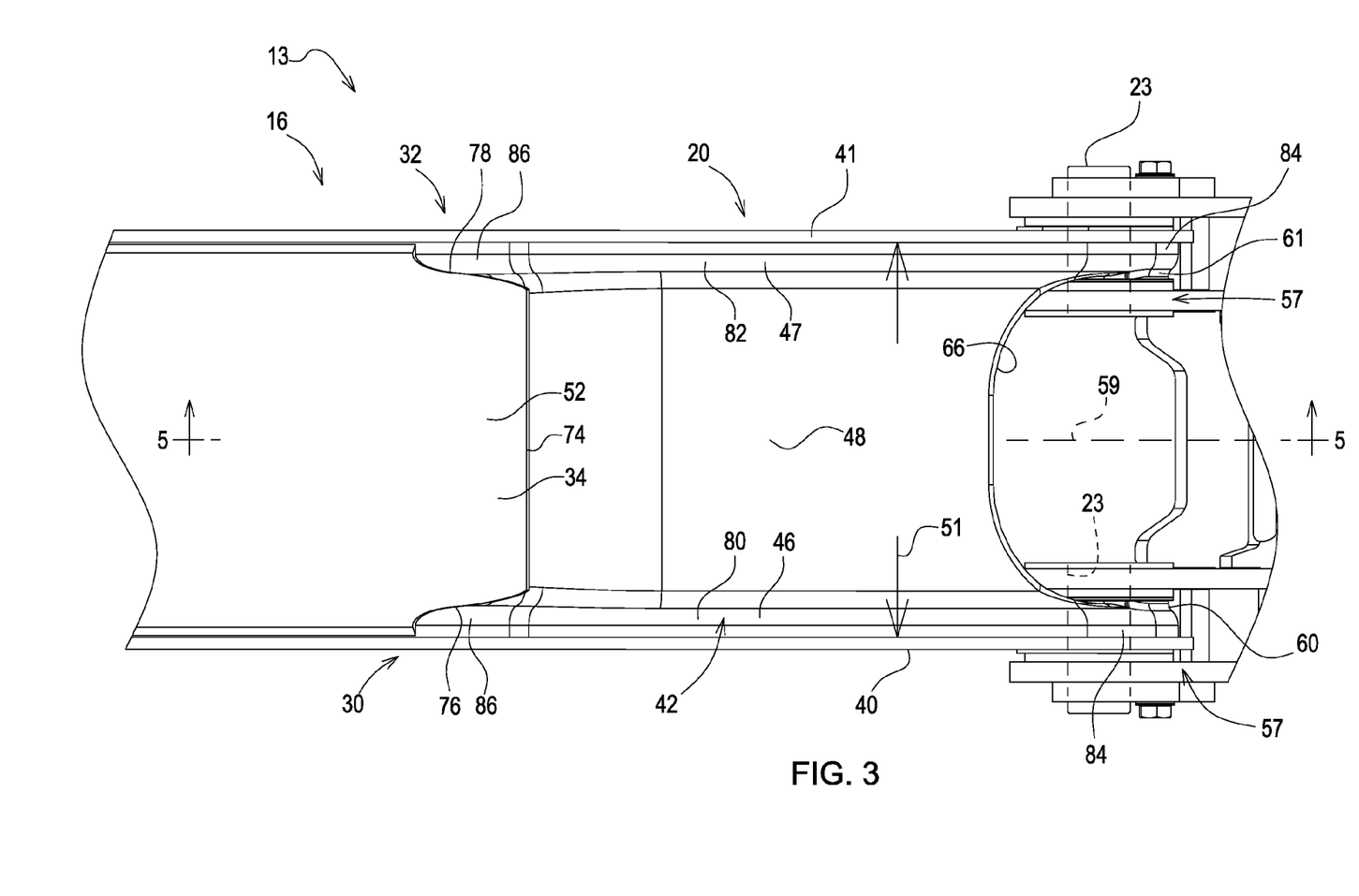
FIG. 3 is a top view, with portions broken away, showing the nose of the boom apparatus.
Figure 4:
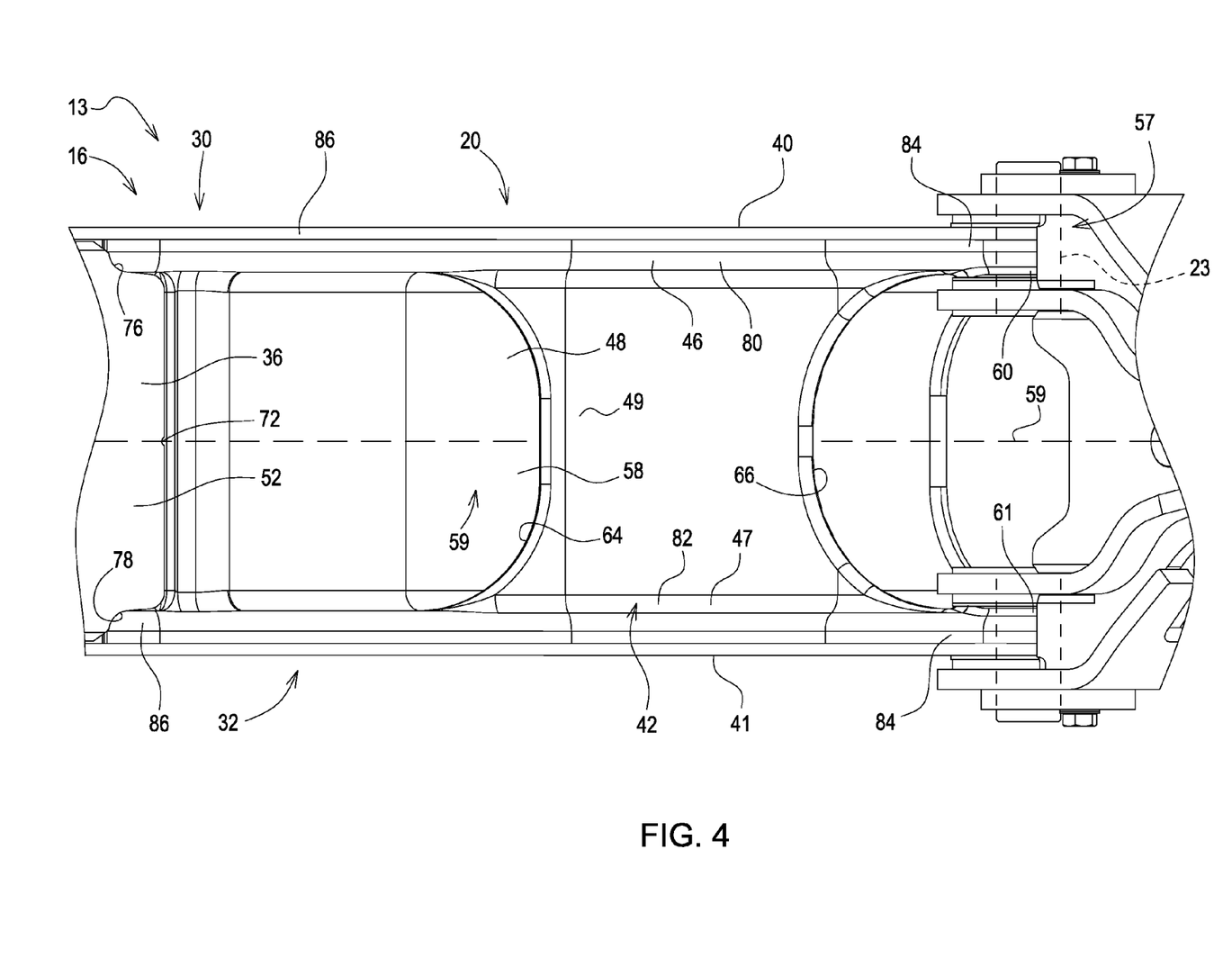
FIG. 4 is a bottom view, with portions broken away, showing the nose of the boom apparatus.

Referring to FIGS. 3 and 4, the first and second body side walls 46, 47 are attached to the top wall 34 and the bottom wall 36. Each of the top wall 34 and the bottom wall 36 comprises a first corner notch 76 and a second corner notch 78. The first body side wall 46 comprises a first rim 80 received in and attached to (e.g., welded) the first corner notch 76 of the top wall 34 and the first corner notch 76 of the bottom wall 36. The second body side wall 47 comprises a second rim 82 received in and attached to (e.g., welded) the second corner notch 78 of the top wall 34 and the second corner notch 78 of the bottom wall 36.

Referring to FIGS. 5 and 6, each of the first and second body side walls 46, 47 is generally kidney bean-shaped in its lateral profile. Each of the first and second body side walls 46, 47 comprises a forward ear 84, a rearward ear 86, and a vertex 88 positioned between the forward and rearward ears 84, 86. The forward ear 84 of the first body side wall 46 comprises the first collar 60. The forward ear 84 of the second body side wall 47 comprises the second collar 61. The spinal wall 48 extends about the barrier wall 49 forwardly from the rearward ears 86 toward the forward ears 84 to the vertices 88 along an upper edge 90 of each of the first and second body side walls 46, 47. The barrier wall 49 is positioned at the vertices 88 and extends along a lower edge 92 of each of the first and second body side walls 46, 47. The ears 84, 86 are configured, for example, as lobes, with the forward ears 84 being larger lobes than the rearward ears in order to provide the collars 60, 61.

As such, the forward ear 84 of the first body side wall 46 is a first ear, and the forward ear 84 of the second body side wall 47 is a second ear. The ears 84 project away from the spinal and barrier walls 48, 49 longitudinally forwardly of the second boom 20.

The nose body 42 is a monolithic structure, promoting stress minimization and sharp-edge avoidance. Exemplarily, the nose body 42 is a casting made, for example, of cast steel. The first and second body side walls 46, 47 are cast in a shell form, promoting weight minimization, such that the walls 46, 47 are recessed from their respective rims 80, 82.

Referring to FIG. 1, each of the first and second boom side walls 30, 32 comprises a laterally inner plate 94 and a laterally outer plate 96 such that the two laterally inner plates 94 are positioned laterally inward from the two laterally outer plates 96 relative to the lateral dimension of the boom 20. In such a case, the plates 94, 96 are welded to one another and to the top and bottom walls 34, 36 (each configured, for example, as a plate). The outer plates 74 extend the length of the boom 18. The outer plate 96 of the first boom side wall 30 provides the first wall extension 40, and the outer plate 96 of the second boom side wall 32 provides the second wall extension 41. The first rim 80 is welded to a laterally inner face of the first wall extension 40 of the laterally outer plate 96 of the first boom side wall 30 and to an end edge of the laterally inner plate 94 of the first boom side wall 30. The second rim 82 is welded to a laterally inner face of the second wall extension 41 of the laterally outer plate 96 of the second boom side wall 32 and to an end edge of the laterally inner plate 94 of the second boom side wall 32.

U.S. patent application Ser. No. 13/236,935, filed 20 Sep. 2011, and U.S. patent application Ser. No. 13/693,373, filed 4 Dec. 2012, are hereby incorporated by reference herein.

The welds and any threads have not been shown in the drawings for simplification of illustration, it being understood that it would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A boom apparatus, comprising
   a clevis pin unit,
   at least one flexible line, and
   a boom, the at least one flexible line extending longitudinally of the boom, the boom comprising
      a first boom side wall,
      a second boom side wall spaced apart from the first boom side wall laterally of the boom,
      a top wall,
      a bottom wall spaced apart from the top wall, the top wall and the bottom wall interconnecting the first boom side wall and the second boom side wall, the first boom side wall, the second boom side wall, the top wall, and the bottom wall cooperating to define a periphery of a box structure of the boom, the first boom side wall and the second boom side wall extending longitudinally of the boom beyond the box structure to provide respectively a first wall extension and a second wall extension, and
      a monolithic nose body positioned at a nose of the boom and the boom apparatus, the nose body attached to and sandwiched between the first and second wall extensions and attached to the top and bottom walls so as to close an end portion of the box structure, the nose body and the first and second wall extensions receiving therein the clevis pin unit such that the nose body, the first and second wall extensions, and the clevis pin unit are included in a clevis of the boom apparatus for suspension of a work tool therefrom, the nose body comprising a passageway through which the at least one flexible line is routed.

2. The boom apparatus of claim 1, wherein the nose body comprises a first body side wall, a second body side wall spaced apart from the first body side wall laterally of the boom, a spinal wall, and a barrier wall spaced apart from the spinal wall, the spinal and barrier walls interconnect the first and second body side walls, the first and second body side walls are attached respectively to the first and second wall extensions, the spinal wall is attached to the top wall and the bottom wall as part of closing the end portion of the box structure by the nose body, the passageway is defined between the spinal and barrier walls and between the first and second body side walls, and the clevis pin unit is received in a first collar of the first body side wall and a second collar of the second body side wall.

3. The boom apparatus of claim 2, wherein the spinal wall is longer than and arches about the barrier wall.

4. The boom apparatus of claim 2, wherein the spinal wall comprises an end edge comprising a groove, and the groove receives an end edge of the bottom wall.

5. The boom apparatus of claim 2, wherein each of the top wall and the bottom wall comprises a first corner notch and a second corner notch, the first body side wall comprises a first rim received in the first corner notches, and the second body side wall comprises a second rim received in the second corner notches.

6. The boom apparatus of claim 2, wherein each of the first and second body side walls is generally kidney bean-shaped in its lateral profile.

7. The boom apparatus of claim 6, wherein each of the first and second body side walls comprises a forward ear, a rearward ear, and a vertex positioned between the forward and rearward ears, the forward ear of the first body side wall comprises the first collar, the forward ear of the second body side wall comprises the second collar, the spinal wall extends about the barrier wall forwardly from the rearward ears toward the forward ears to the vertices along an upper edge of each of the first and second body side walls, and the barrier wall is positioned at the vertices and extends along a lower edge of each of the first and second body side walls.

8. The boom apparatus of claim 2, wherein the first body side wall comprises a first ear, the second body side wall comprises a second ear, the first and second ears project away from the spinal and barrier walls longitudinally forwardly of the boom and comprise respectively the first collar and the second collar.

9. The boom apparatus of claim 2, wherein the at least one flexible line is routed through a rearward opening defined between the spinal wall and the barrier wall and a forward opening defined between the spinal wall and the barrier wall.

10. The boom apparatus of claim 1, wherein the nose body is a casting.

11. The boom apparatus of claim 1, wherein the nose body bridges a width between the first and second wall extensions laterally of the boom.

12. The boom apparatus of claim 1, wherein the nose body comprises a wall attached to the top wall and the bottom wall as part of closing the end portion of the box structure by the nose body.

13. The boom apparatus of claim 12, wherein the wall of the nose body comprises an end edge comprising a groove, and the groove receives an end edge of the bottom wall.

14. The boom apparatus of claim 1, wherein each of the top wall and the bottom wall comprises a first corner notch and a second corner notch, the nose body comprises a first rim received in the first corner notches and a second rim received in the second corner notches.

15. The boom apparatus of claim 1, wherein the nose body is arched in its lateral profile.

16. The boom apparatus of claim 1, wherein the passageway is arched.

* * * * *